United States Patent
Chen et al.

(10) Patent No.: US 7,613,016 B2
(45) Date of Patent: Nov. 3, 2009

(54) POWER AND INFORMATION SIGNAL TRANSFER USING MICRO-TRANSFORMERS

(75) Inventors: Baoxing Chen, Westford, MA (US); Ronn Kliger, Lexington, MA (US)

(73) Assignee: Analog Devices, Inc., Norwood, MA (US)

(*) Notice: Subject to any disclaimer, the term of this patent is extended or adjusted under 35 U.S.C. 154(b) by 0 days.

(21) Appl. No.: 11/593,360

(22) Filed: Nov. 6, 2006

(65) Prior Publication Data
US 2008/0094046 A1 Apr. 24, 2008

Related U.S. Application Data (62) Division of application No. 10/922,504, filed on Aug. 20, 2004, now Pat. No. 7,489,526.

(51) Int. Cl.
*H02M 3/335* (2006.01)
*H02M 7/516* (2007.01)

(52) U.S. Cl. .......................................... 363/17; 363/98

(58) Field of Classification Search .............. 363/21.07, 363/21.08, 21.15, 21.16, 97, 131, 15, 16, 363/17, 98, 132
See application file for complete search history.

(56) References Cited

U.S. PATENT DOCUMENTS

| | | | |
|---|---|---|---|
| 4,065,713 A | 12/1977 | Pollmeier | |
| 4,318,170 A | 3/1982 | Cabalfin | |
| 4,443,839 A | 4/1984 | Onodera et al. | |
| 4,475,149 A | 10/1984 | Gallios | |
| 4,785,345 A | 11/1988 | Rawls et al. | |
| 4,912,617 A * | 3/1990 | Hartmann et al. | ........ 363/21.07 |
| 4,920,474 A | 4/1990 | Bruning et al. | |
| 5,327,030 A | 7/1994 | DeVito et al. | |
| 5,329,225 A | 7/1994 | Roshen et al. | |
| 5,339,061 A | 8/1994 | Reick | |
| 5,394,319 A | 2/1995 | Attwood et al. | |
| 5,636,110 A | 6/1997 | Lanni | |
| 5,774,350 A | 6/1998 | Notaro et al. | |
| 5,998,979 A | 12/1999 | Nilsson | |
| 6,040,986 A | 3/2000 | Sakamoto et al. | |
| 6,208,531 B1 * | 3/2001 | Vinciarelli et al. | ....... 363/21.07 |
| 6,266,254 B1 | 7/2001 | Ohtake | |

(Continued)

FOREIGN PATENT DOCUMENTS

EP 0708529 4/1998

OTHER PUBLICATIONS

S.C. Tang, et al., "A Low-Profile Low-Power Converter with Coreless PCB Isolation Transformer." IEEE Transactions on Power Electronics, May 2001, 311-315, vol. 16. No. 3.

(Continued)

*Primary Examiner*—Gary L Laxton
(74) *Attorney, Agent, or Firm*—Kenyon & Kenyon LLP

(57) ABSTRACT

A power converter provides power across an isolation barrier, such as through the use of coils. A coil driver has transistors connected in a positive feedback configuration and is coupled to a supply voltage in a controlled manner by measuring the output power and opening or closing a switch as needed between the power supply and the coil driver. An output circuit, such as a FET driver, can be used with or without isolation to provide power and a logic signal.

8 Claims, 12 Drawing Sheets

U.S. PATENT DOCUMENTS

| | | |
|---|---|---|
| 6,291,907 B1 | 9/2001 | Haigh et al. |
| 6,317,338 B1 | 11/2001 | Boys |
| 6,344,979 B1 | 2/2002 | Huang et al. |
| 6,504,732 B2 | 1/2003 | Abe |
| 6,538,532 B2 | 3/2003 | Petrovic |
| 6,542,385 B1 | 4/2003 | Emmons et al. |
| 6,603,383 B2 | 8/2003 | Gevorgian et al. |
| 6,606,260 B2 | 8/2003 | Ahlstrom |
| 6,621,365 B1 | 9/2003 | Hallivuori et al. |
| 6,738,240 B1 * | 5/2004 | Ahn et al. .................... 361/38 |
| 6,747,421 B2 | 6/2004 | Kohn |
| 6,765,809 B2 | 7/2004 | Komori |
| 6,807,070 B2 | 10/2004 | Ribarich |
| 6,911,848 B2 | 6/2005 | Vinciarelli |
| 6,927,662 B2 | 8/2005 | Kahlmann et al. |
| 6,993,087 B2 | 1/2006 | Rosnell et al. |
| 7,061,189 B2 | 6/2006 | Newman, Jr. et al. |
| 7,075,329 B2 | 7/2006 | Chen et al. |
| 7,098,766 B2 * | 8/2006 | Gardner et al. .............. 336/200 |
| 7,171,739 B2 | 2/2007 | Yang et al. |
| 7,199,562 B2 | 4/2007 | Muterspaugh |
| 2004/0184289 A1 | 9/2004 | Vinciarelli |

OTHER PUBLICATIONS

DC-DC Converters: A Primer, Jaycar Electronics Reference Data Sheet: DCDCONV.PDF 2001 5 pgs.

DC-DC Converter Basics, Power Designers, pp. 1-11, www.powerdesigners.com/infoweb/design_center/articles/DC-DC/converter.shtm.

"An Electric Pendulum", AC, Jul. 12, 2004, pp. 1-5. Chapter 6: Resonance, vol. II, www.allaboutcircuits.com.

DC-DC Converter Basics, Power Designers, pp. 1-11, www.powerdesigners.com/infoweb/design_center/articles/DC-DC/converter.shtm, Jul. 12, 2004.

* cited by examiner

POWER AND INFORMATION SIGNAL TRANSFER USING MICRO-TRANSFORMERS

RELATED APPLICATIONS

This is a Divisional application of U.S. patent application Ser. No. 10/922,504, filed on Aug. 20, 2004 now U.S. Pat. No. 7,489,526, hereby incorporated by reference herein.

FIELD OF THE INVENTION

This invention relates to power and information signal transfer using micro-transformers.

BACKGROUND OF THE INVENTION

Electrical (galvanic) isolation between devices can be provided with an isolator with an isolation barrier is between input circuitry and output circuitry. The input circuitry can be referenced to a first ground and the output circuitry can be referenced to a different, second ground, which is galvanically isolated from the first ground such that there is no current between them.

In addition to providing for isolated transfer of an information signal, such devices typically also have input and output circuitry to be powered by power supplies that are isolated from each other. The power supplies can be provided, for example, with two separate power supplies having different ground, or by providing an isolated DC-DC converter with discrete transformers to derive power for one side of the barrier from power supplied to the other side of the barrier.

Figure 1:
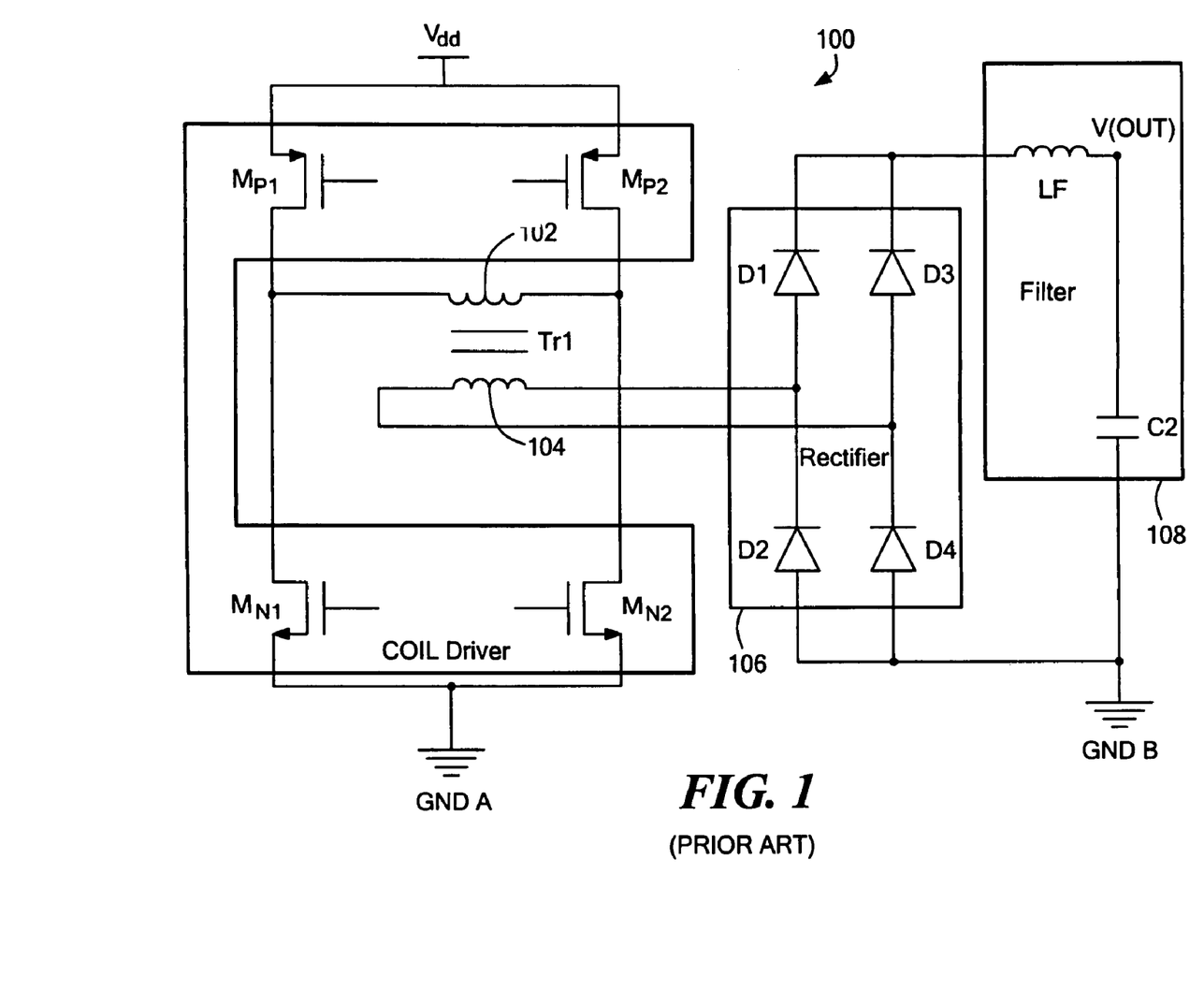
FIG. 1 is a simplified schematic circuit diagram of a typical prior art full-bridge, switching DC-DC converter.

An example of a full-bridge forward DC-DC converter is shown in FIG. 1. A converter 100 has switching transistors MP1, MP2, MN1, and MN2 driving a transformer TR1. The four switching transistors can be implemented in all PMOS or all NMOS type. In typical operation, first the transistors MP1 and MN2 are on for a time interval DT (0<D<1); then transistors MN1 and MN2 are on for a time interval (1-D)T, where T represents half the period of a cycle. Next, transistors MP2 and MN1 are on for a time duration of DT; and transistors MP1 and MP2 are on for the duration of the cycle. The voltage or power transfer is controlled by the variable D, as power is transferred only during the two DT periods.

During the first DT interval when transistors MP1 and MN2 are closed (on), current is provided through the primary winding 102 of transformer TR1 and induced in secondary winding 104 for delivery to a rectifier 106, filter 108 and a load (not shown) which is connected between the output terminal V(OUT) and an output-side ground GNDB (which is distinguished from the input-side ground GNDA). Current is also drawn to charge the magnetizing inductance of the transformer. This magnetizing inductance gets discharged in the second DT interval when transistors MP2 and MN1 are turned on.

To produce a small isolator, micro-transformers can be used. As used here, a "micro-transformer" means a small transformer in which at least one winding is formed using planar fabrication methods, including but not limited to semiconductor techniques, and preferably in a way that facilitates interconnection with other circuit elements on the same or similar substrate. A planar winding can be formed over (on or above) a silicon substrate, or on a printed circuit board (PCB) or other material. A micro-transformer is said to be "on-chip" if the windings are both formed over a semiconductor substrate, potentially in contact with or spaced from the substrate. Examples of on-chip micro-transformers, and particularly "air-core" micro-transformers, are shown in commonly assigned U.S. Pat. No. 6,291,907 and U.S. patent application Ser. No. 10/214,883, filed Aug. 8, 2002, and published as publication no. 2003/0042571, both of which are incorporated by reference herein in their entireties. Micro-transformers typically have small inductance (L) and high series resistance (R), so they have small L/R values. The interval DT should be shorter than L/R, or else the transformers will get current saturated and lose efficiency because of the voltage drop across series resistance R. If a filtering inductor $L_F$ is also formed as a micro-inductor, further efficiency can be lost due to high series resistance. Large filter inductance can be difficult to obtain with a micro-transformer, thereby encouraging the use of a high value of a filter capacitor C2 to minimize ripple on the converter output. Use of a large filter capacitors is generally inconsistent with a goal of making a small isolators.

In order to use micro-transformers, high switching frequencies are used to drive the transistor switches, in some devices with resonant switching. But as the frequency gets high and DT gets small, the control circuitry can become more complex and difficult.

SUMMARY OF THE INVENTION

The embodiments described here include a power converter that can provide power across an isolation barrier, such as through the use of coils. Embodiments include a power converter with an on-chip micro-transformer, and a coil driver with transistors connected in a positive feedback configuration with a transformer. The on-chip transformer need not have a ferrous core. The coil driver can be coupled to a supply voltage in a controlled manner by measuring the output power and opening or closing a switch as needed between the power supply and the coil driver. Other embodiments described here include a FET driver that can be used with or without isolation.

Transformers used in the circuits can be air core devices and can be formed as very small devices on one or more substrates using semiconductor processing techniques, thereby producing a small device. Other features and advantages will become apparent from the following detailed description, drawings, and claims.

DETAILED DESCRIPTION OF THE INVENTION

The inventions here are not limited in their application to the details of construction and the arrangement of components set forth in the following description or illustrated in the drawings, and are capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items. Aspects of the embodiments may be practiced individually or in various combinations, both illustrated and unillustrated, and each embodiment shown or discussed is intended as a non-limiting example.

Examples will now be discussed of isolators powered by a single supply from which a second isolated supply is derived via the use of micro-transformers.

Figure 2A:
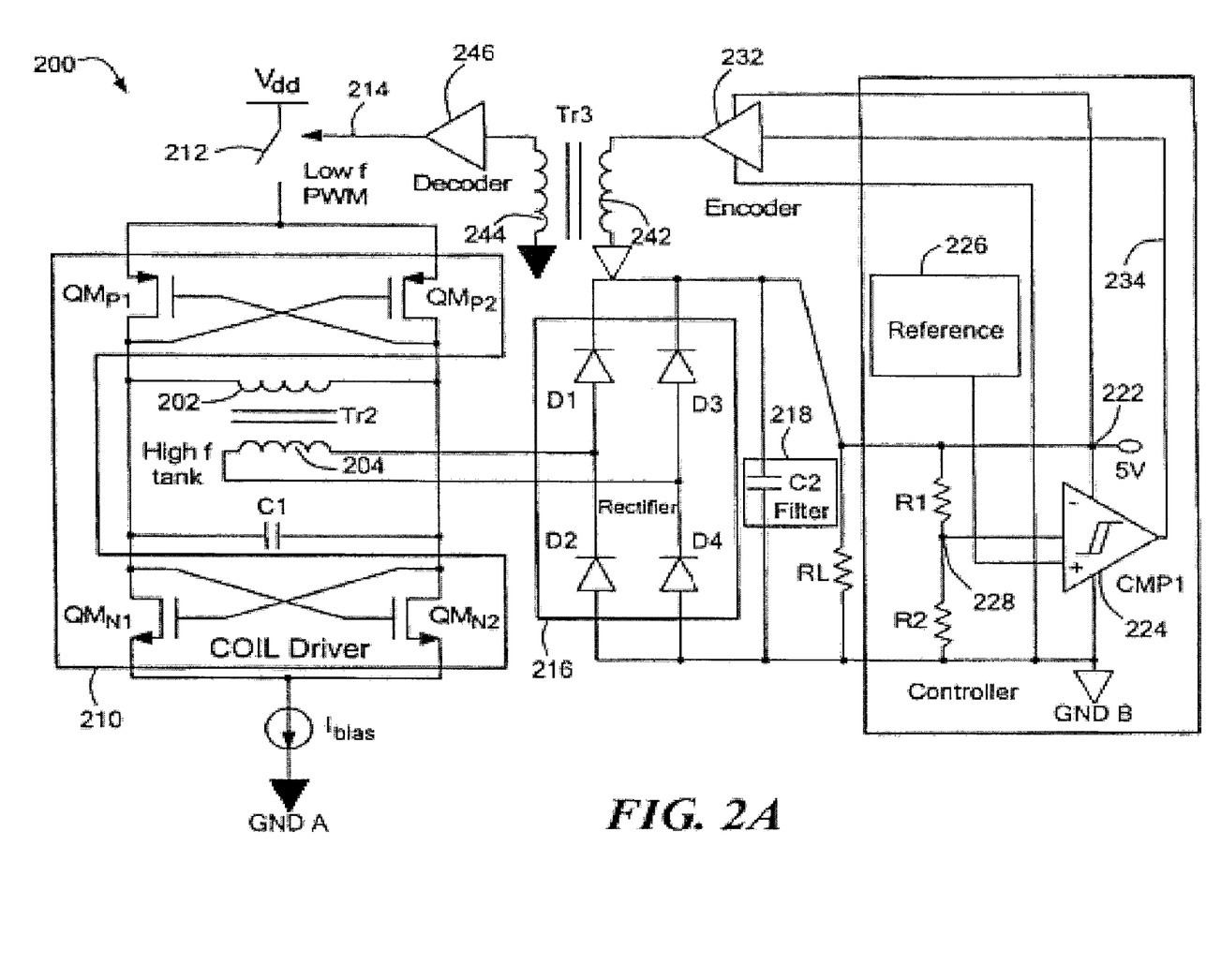
FIG. 2A is a simplified part-schematic, part-block diagram of an isolated power converter, and FIG. 2B has a set of waveforms for the circuit of FIG. 2A.

With reference to FIG. 2A, a simplified schematic circuit diagram of a first example of an implementation of an isolated power converter 200 is shown. A voltage source Vdd is coupled through a switch 212 to a coil driver 210. Coil driver includes transistors QMP1, QMP2, QMN1 and QMN2, which are connected in a positive feedback configuration. These transistors preferably do not have their gates coupled directly to a control circuit to switch them on and off, but rely on switch 212 for connection to a voltage supply.

To drive a power transformer TR2, which can be formed as an on-chip micro-transformer, a capacitor C1 is in parallel with a primary winding 202 of the transformer, forming an LC tank network. The tank network switches at a frequency f, given by $$f = \frac{1}{2\pi\sqrt{LC}},$$

where L is the inductance of the primary winding 202 and C is the total capacitance across the primary winding, including C1 and the gate to drain capacitances of the four switching transistors. The tank circuit may or may not have a separate capacitor; if not, the capacitances will only be the gate to drain capacitances of the transistors. Power is delivered by a secondary winding 204 to a resistive load on the secondary side (not shown) as if the resistive load were across the LC tank network. The frequency f is preferably greater than 10 MHz, more preferably greater than about 50 MHz, and still more preferably greater than about 100 MHz. In one example, the inductance of the primary winding was about 12 nH and the frequency about 100 MHz, meaning that the capacitance was about 200 pF.

Due to the small value of L/R of integrated transformer TR2 and the lack of a ferrous transformer core, the tank network should switch at a relatively high frequency, both to avoid current saturation and to have high efficiency. The efficiency of the tank network is proportional to the Q of the tank, which is given by $$Q = \omega \frac{L_{202}}{R_{202}},$$

where $L_{202}$ and $R_{202}$ are the inductance and series resistance, respectively, of the primary winding 202. The secondary winding also contributes to the efficiency.

Figure 3:
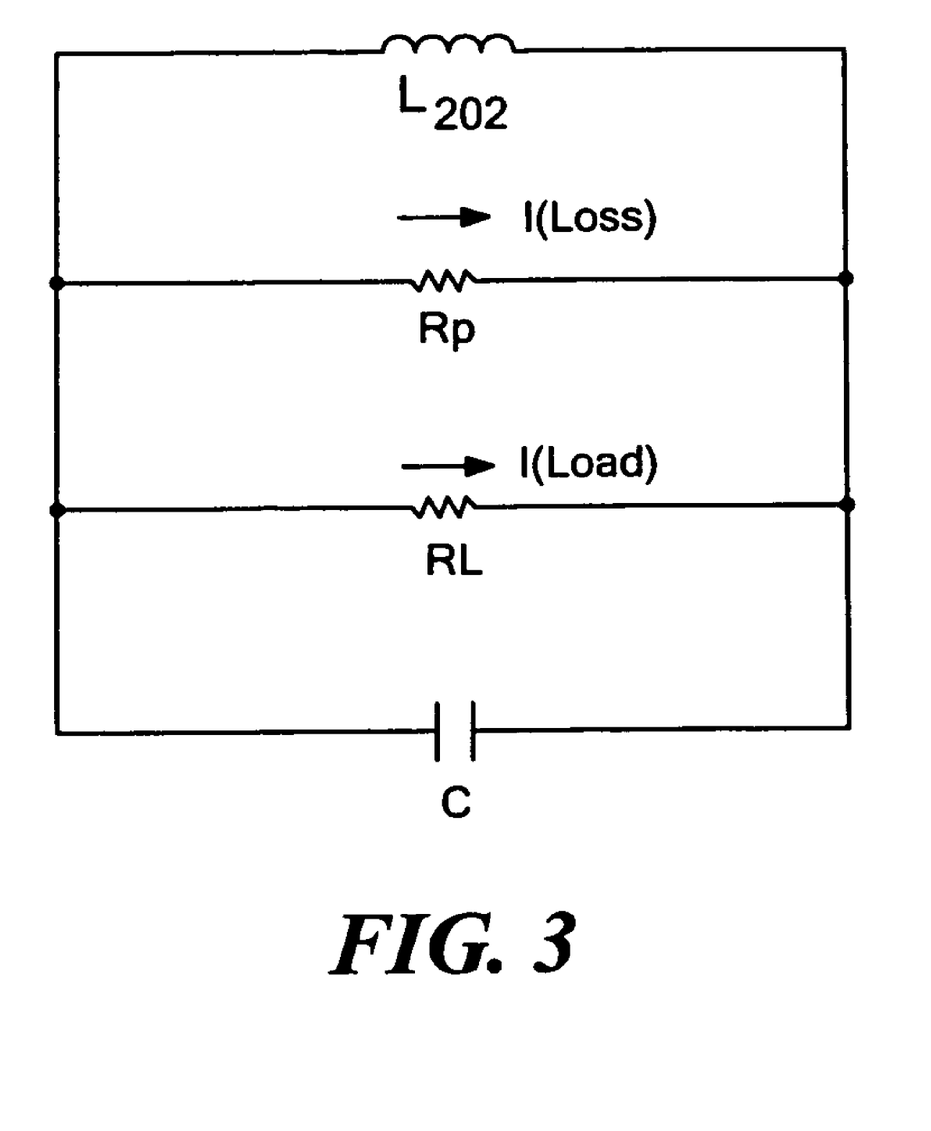
FIG. 3 is a schematic of a tank circuit.

Turning to FIG. 3, a tank circuit can be modeled as a primary winding inductance $L_{202}$ in parallel with the a capacitance C across the primary winding and further in parallel with an actual load resistance RL and a resistance Rp, which represents the tank dissipation and is given by the formula $Rs(Q^2+1)$, where $R_s$ is the series resistance of the primary winding. The relationship between Rp and RL determines the efficiency of the tank circuit. If Rp is infinitely large, all of the energy gets transferred to load resistance RL. The smaller the value of Rp, the greater the percentage of the energy of the tank that is lost in Rp and is unavailable for transfer to the load.

Less than ideal coupling from the transformer's primary winding to its secondary winding means that some energy gets lost. In a typical implementation of stacked coils in an air-core transformer, a coupling coefficient of 0.9 has been found to be achievable. However, for the tank circuit to sustain oscillation, the value of the parallel combination of resistors Rp and RL should be larger than 1/gm, where gm is the transconductance of the switches.

Some power savings can be achieved by not energizing the tank circuit all of the time. For a certain percentage of the time, it can be de-energized and a sufficient amount of power will still be transferred into the load. This ability depends on load power requirements.

To de-energize the tank circuit, the state of switch 212 is controlled by a pulse-width modulator (PWM) signal supplied on line 214. Transformer TR2 is thus driven by a modulated signal such that power is transferred at greater efficiency, with the average power being controlled through the average "on" time of the LC tank circuit. This control eliminates the need to control the duty cycle of the high frequency signal going into the primary coil, as in a typical full-bridge converter such as that shown in FIG. 1.

The signal on secondary winding 204 is provided through a rectifier 216 to a capacitive filter 218 with capacitor C2 can be employed. The capacitor may be external to the chip, but some on-chip capacitance also is desirable because external by-pass capacitors also have high equivalent series inductance (ESL). The resulting signal, which can be about 5 volts, is provided across the load represented by RL.

In some applications, if voltage regulation is desired, a dynamic switching controller circuit can be implemented as shown in FIG. 2A. This controller monitors the output voltage and compares it with a reference voltage from a reference source 226 in a comparator 224. As indicated in FIG. 2A, the voltage that is compared can be scaled down from the output voltage at node 222 by using a resistive voltage divider with resistors R1 and R2 connected at node 228, and thus the voltage at node 228 is actually compared with the reference voltage from reference source 226. If the voltage on node 228 is higher than the reference voltage (i.e., higher than required), the output of comparator 224 is driven to a low value, which is supplied to an encoder 232 via a line 234. Encoder 232 drives a primary winding 242 of a transformer TR3 with a signal, and a secondary winding 244 of transformer TR3 couples a corresponding signal to an input of a decoder 246. In response, decoder 246 emits a control signal on line 214 to control the LC tank network. If the scaled output voltage on node 228 falls below the threshold established by reference source 226, the output of comparator 224 becomes high, and the encoder 232 transmits a corresponding signal through transformer TR3 to decoder 246. Decoder 246 then transmits a control signal on line 214 to close switch 212 to allow the LC tank to oscillate.

The actual output voltage at node 222 depends on the output current, due to the series resistance of the secondary coil 204 of the power transformer TR2, thereby making regulation possible.

Transformers TR2 and TR3 are preferably micro-transformers. The same process can be used to manufacture power transformer TR2 and control signal transformer TR3, or they could be made separately in different ways. The circuitry on the "left" side of the two transformers is referenced to a first ground, GNDA (indicated by a black-filled downwardly-pointing triangle), whereas the circuitry to the "right" side of the two transformers is referenced to a different ground, GNDB, electrically isolated from the first ground (indicated by an open downwardly-pointing triangle).

Figure 2B:
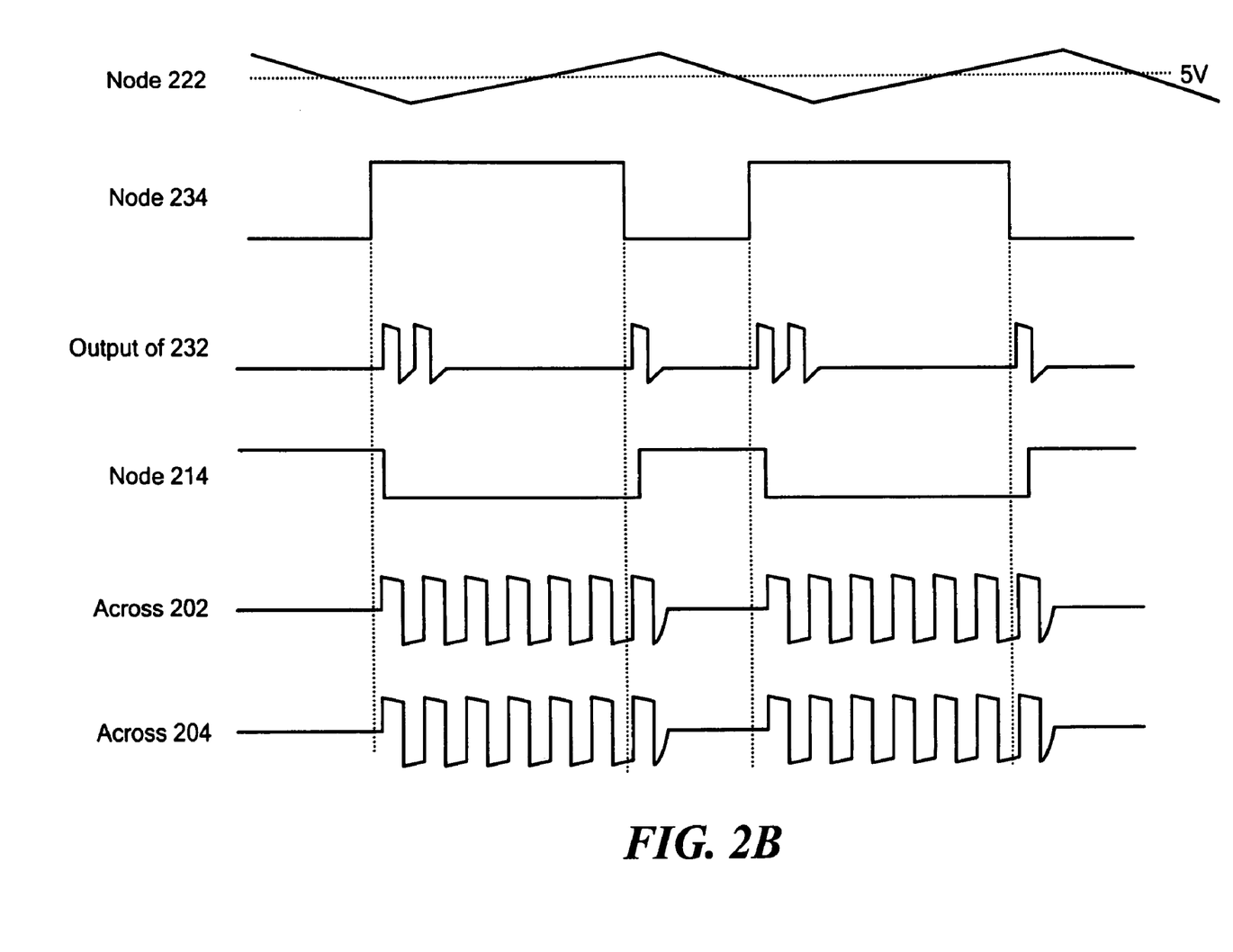

FIG. 2B shows an exemplary set of waveforms for the circuit of FIG. 2A. The output voltage at node 222 is shown as a DC signal of about 5 volts with a ripple that may be, e.g., about +/−50 mV. When the signal on node 222 falls below a threshold, comparator 224 outputs a high signal on line 234. This signal is provided to an encoder 232 that provides an encoded signal. One example of such an encoded signal as shown in FIG. 2B is to use a dual pulse for a rising edge and a single pulse for a falling edge. Decoder 246 detects the encoded signal and generates a delayed and inverted version of the signal on line 234 to open and close switch 212. When the signal on node 214 goes low, switch 212 closes to allow the tank circuit to provide an oscillating signal, at a frequency determined by the components of the tank circuit, e.g., at about 100 MHz. This signal is then provided by secondary winding 204 to rectifier 216. The rectified signal is filtered by capacitive filter 218 to produce a signal similar to that shown in FIG. 2B for node 222.

Figure 4:
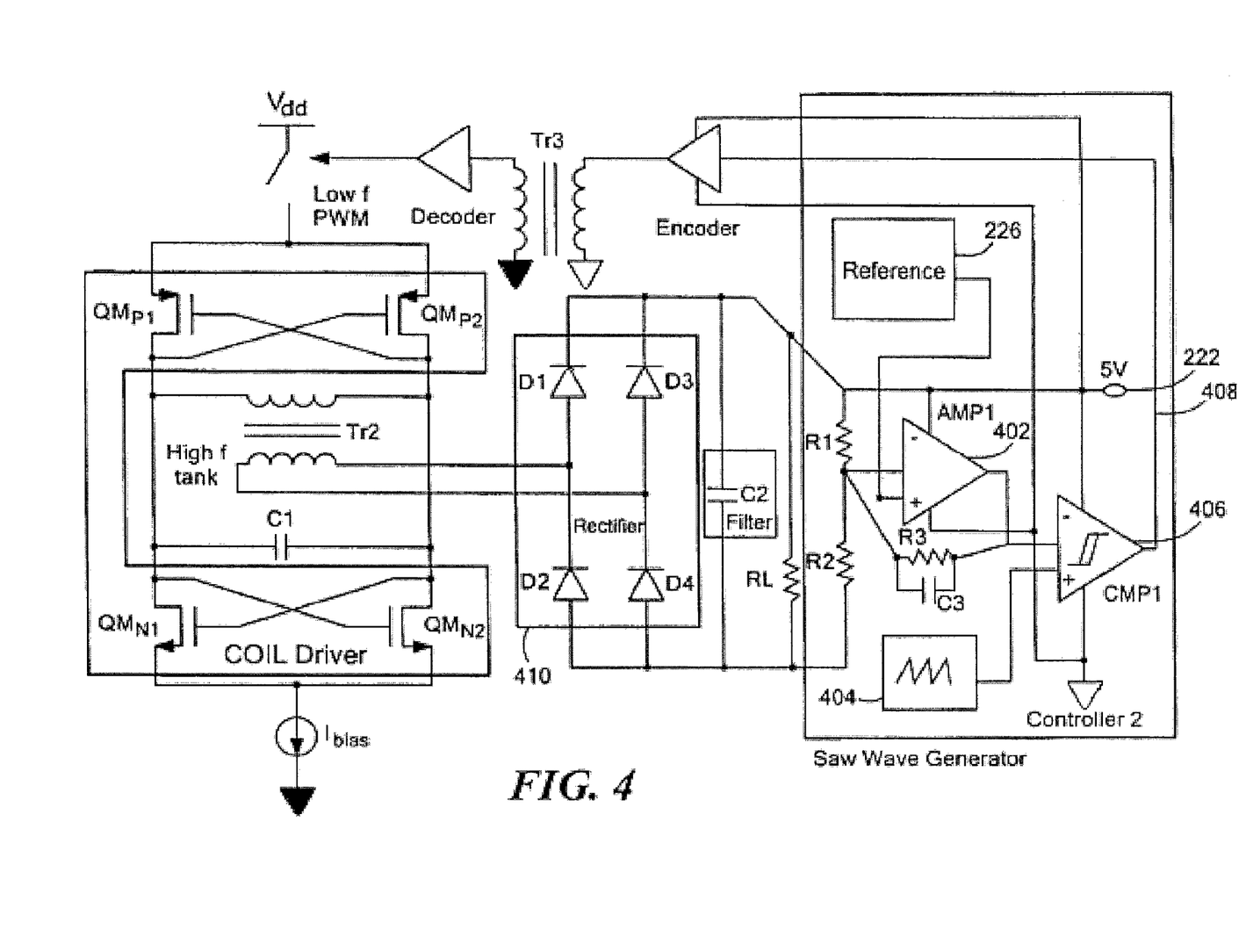
FIGS. 4 and 5 are alternative embodiments to the circuit of FIG. 2A.
Figure 5:
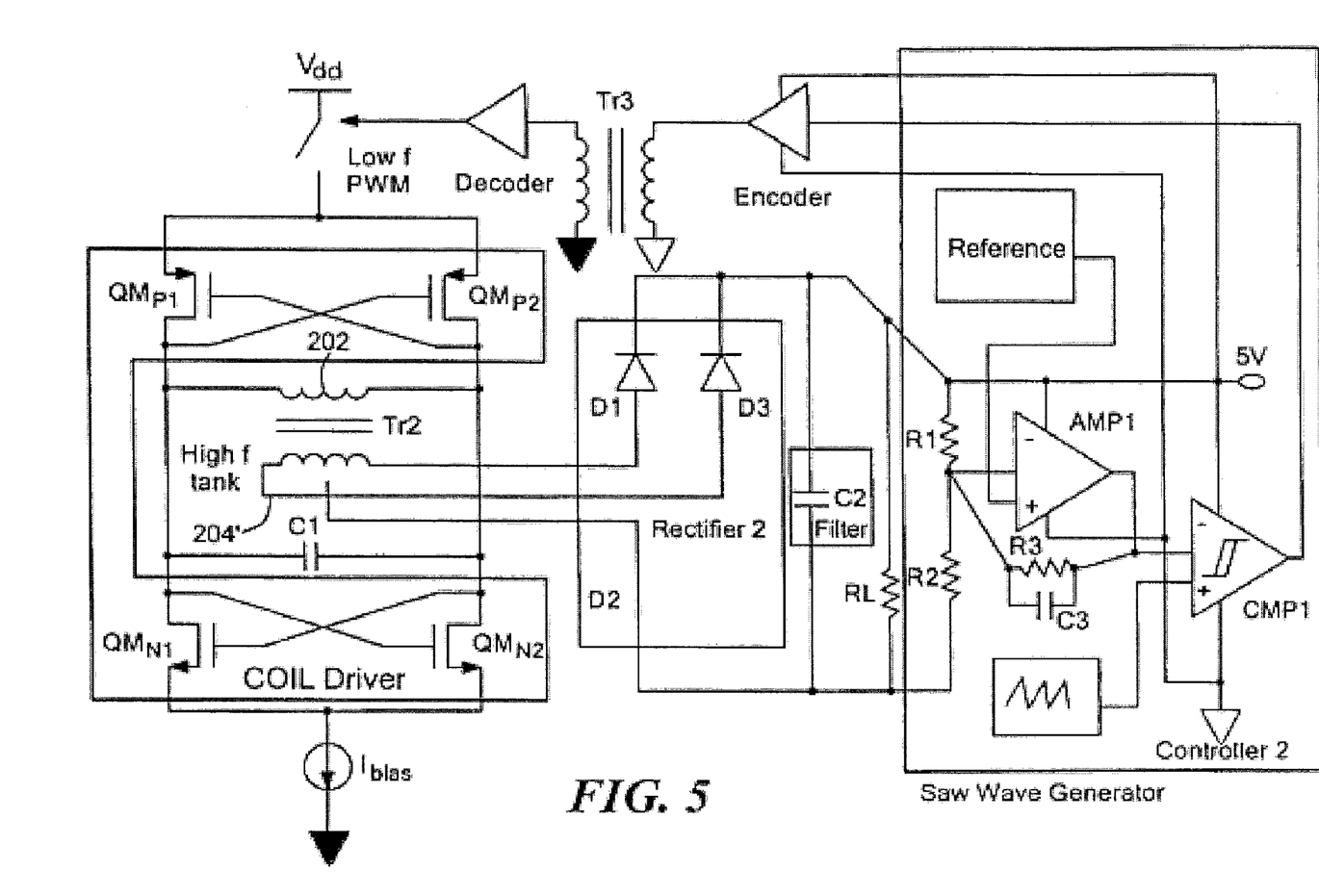

Referring to FIGS. 4 and 5, in other embodiments, the coil driver, rectifier, and capacitive filter are similar to those in FIG. 2A, but the controller circuitry is implemented in a different configurations. In the embodiment of FIG. 4, the scaled down output voltage is provided to an amplifier 402 (replacing comparator 224 of FIG. 2A) to produce an error voltage. The error voltage is compared in comparator 406 with a (fixed-frequency) saw-tooth wave signal from a saw-tooth wave generator 404. As a result, a fixed-frequency PWM control signal is generated on line 408 and provided to encoder 232 to control a switch in a manner similar to that shown in FIG. 2A.

A rectifier 410 in FIG. 4 can be a simple bridge circuit (comprising diodes D1-D4) with capacitor C2 serving as a capacitive filter and with no series filter inductor at the output of the rectifier. Other rectification configurations may be employed. For example, in the embodiment of FIG. 5, a rectifier has only two diodes, D1 and D3, with a center-tapped secondary transformer winding 204' as part of transformer TR2.

As an alternative to the feedback approach shown in FIGS. 2A, 4 and 5, a power converter can be implemented with the control signal for the PWM tank switch being set to a certain duty cycle that is fixed or programmed by some other means.

These arrangements can be configured by selecting the turns ratio of the windings of transformer TR2 to provide either a step up or a step down voltage transfer, depending on the particular desired output voltage to input voltage relationship. In one embodiment, the secondary winding has two times the number of windings in the primary winding, and thus has four times the inductance of the primary winding. The power that is transferred across transformer TR2 would typically be greater than 100 mW and could be more than 500 mW, and could be up to 1 W (or possibly greater).

The use of micro-transformers for logical data transfer and power transfer, and also as needed for other control signals in the feedback path, can make it easier to integrate all of the isolation functions. The same manufacturing processes can be used to make all the transformers, although different processes could be used. Moreover, any number of data channels, unidirectional or bidirectional, can be added, to provide an arbitrary number of self-powered isolators. A single transformer can be used for both power and data transfer. For example, an input digital signal or a signal derived therefrom can be used to control tank switch 212; and a receiver can be added to decode the input digital signal from the modulated signal in the power converter.

These approaches to power conversion can be employed where signal isolation is not a factor to get power to different parts of a chip, such as where power bus routing is difficult or where a different supply voltage is needed. These circuits using micro-transformers can thus be used to provide local step-up or step-down of an available supply voltage to provide another voltage.

Any suitable micro-transformer design can be used, but in these embodiments the micro-transformers discussed herein are preferably core-less transformers, sometimes referred to as "air core" transformers, and preferably on-chip; however, the circuits described here could be used with transformers with ferrous cores, micro-transformers formed on opposite sides of a PCB, or with transformers formed with known discrete wire windings. In core-less transformers, efficiency can be obtained by (a) manufacturing the transformer windings very close together, and (b) operating the transformers at high frequencies. Currently, the use of cores can add thickness, weight, and cost, and can also require the use of lower frequencies. Further, for the same coil dimensions, one can typically obtain a higher amount of isolation between coil windings using an air core approach, although embodiments described here would not preclude use of a core. One material that is often used to fabricate metal layers in integrated circuits is aluminum. When the metal layer is to be used for a coil winding for a transformer, it can be helpful to increase the thickness of the bottom coil in order to lower its resistance and increase its L/R ratio.

One or both coil windings may be formed of a non-process metal, i.e., a metal different from that used in the processing that forms the semiconductor devices and circuitry. In a post-processing operation or series of operations, after the circuit elements have been formed, the transformers may be fabricated of gold or another metal that is deposited over a substrate that already contains circuit elements. This approach allows the coil windings to be made thicker than typical metal layers in, for example, a CMOS process used to form the switching transistors and other components. In one embodiment, an on-chip micro-transformer has three layers of metal, such that the layers from substrate outwardly are substrate, wafer passivation layer, a first metal layer is over the wafer passivation layer for connection from a bond pad to a center of a spiral, a first insulating layer, a first bottom winding connected to the first metal layer through a via, a second insulating layer, and a second top winding. In a still further variation or alternative embodiment, after the other components have been formed using, for example, CMOS fabrication, a dielectric such as an oxide or polyimide layer, as thick as desired, may be formed over the substrate and the coil windings can then be formed on top of this layer. Such an approach lifts the bottom coil off the substrate, reducing the capacitance from the bottom coil to the substrate. Polyimide is an example of a dielectric that can be used for such a structure, and for use in separating the windings, as it tends to have better electrostatic discharge properties and resist punch through better than many oxides, although oxides could be used.

The two transformers TR2 and TR3 can, but need not, have identical construction. For example, coil 244 in transformer TR3 does not need to have a low resistance and therefore can be made differently from other coils.

The power transfer (DC-DC converter) arrangements illustrated in FIGS. 2A, 4, and 5 can be combined with isolators such as those disclosed in the incorporated patents and applications to provide low-cost signal and power transfer and isolation in an integrated circuit package, manufactured using integrated circuit fabrication techniques.

Figure 6:
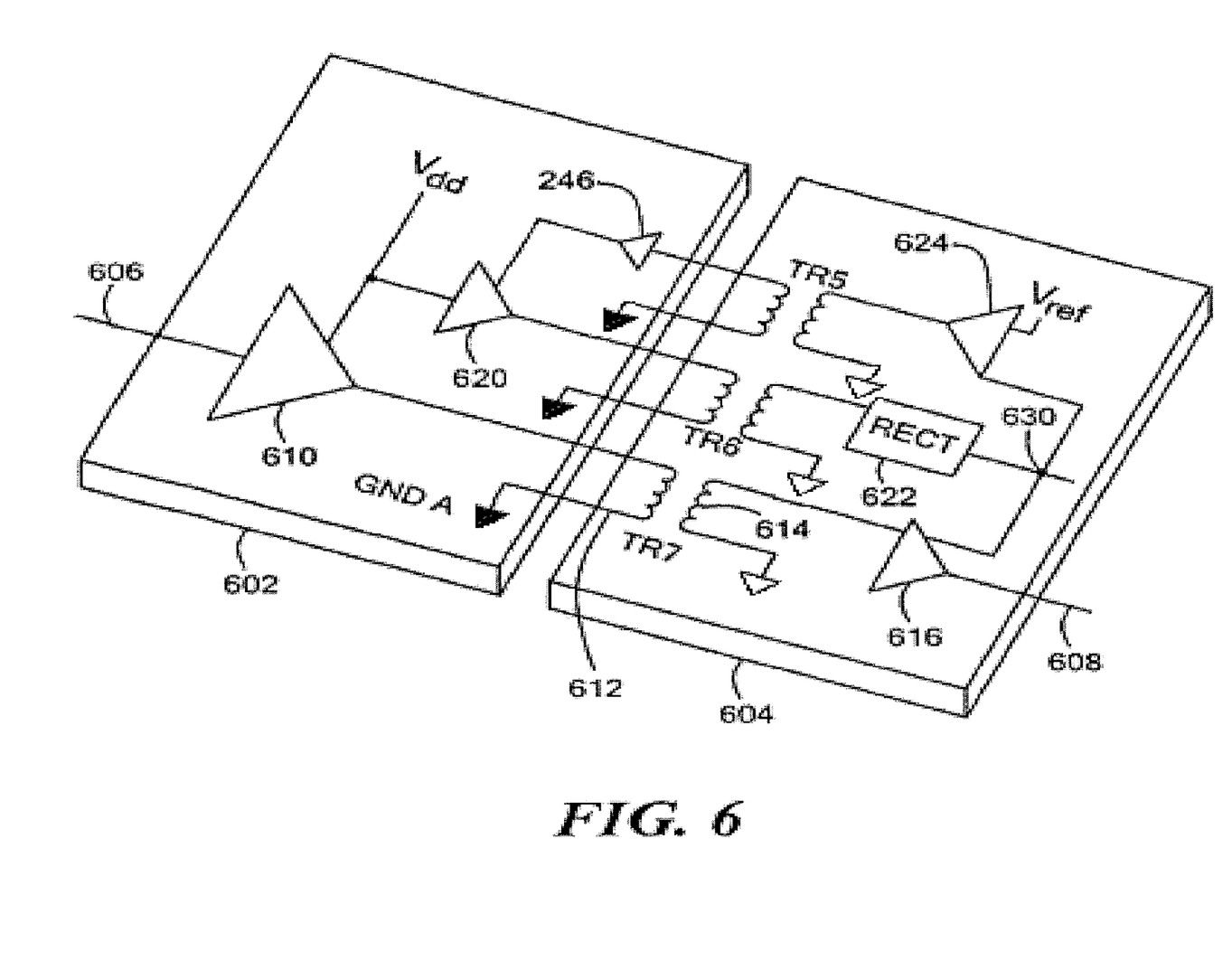
FIG. 6 is a part perspective, part schematic view of a circuit similar to that in FIG. 2A, as implemented on substrates.

Referring to FIG. 6, this diagrammatic illustration shows how a power converter can be formed on two substrates 602 and 604. A logical signal input supplied at node 606, the circuitry on substrate 602, and one coil of each of transformers TR5, TR6, and TR7 are referenced to a first ground, GNDA. These transformers can be micro-transformers, and can be core-less on-chip transformers. A signal output supplied at node 608, the circuitry on substrate 604, and another coil of each of the transformers are referenced to a second ground, GNDB. A transmitter circuit 610 receives an input information (e.g., logic) signal applied to node 606 and drives a primary winding 612 of a transformer TR7. A secondary winding 614 of transformer TR7 provides a corresponding waveform to a receiver circuit 616. The receiver circuit decodes the received waveform and constructs an output signal 608 that reproduces input signal 606. The operation and construction of the transmitter and receiver circuits may, for example, be as discussed in the incorporated documents.

A coil driver 620, preferably similar to coil driver 210 in FIG. 2A, receives an input from Vdd and drives a primary winding of transformer TR6. The secondary winding of transformer TR6 is provided to a rectifier 622 with filtering (not shown) to provide a regulated power converter output at node 630. The power converter output is also fed back to a feedback controller, represented by comparator 624 (which includes both the sensing and comparison circuits of FIGS. 2, 4, and 5, and the encoder 232), which provides the signal to a primary winding of transformer TR5. The secondary winding of TR5 provides a signal to a decoder 246, which provides a control signal to control the connection between the supply voltage and the coil driver 620, such as by controlling a switch as shown in FIG. 2A.

The isolator circuitry and power converter circuitry can be packaged in any suitable manner. For example, there could be multiple isolators powered by a single power converter, or there might be provided bi-directional isolators. The power converter can supply isolated power for a receiving circuit of one or more isolators and for the transmitter circuit of one or more other isolators (or channels). The transformers are shown as being fabricated on substrate 604, but could be fabricated on substrate 602. While FIG. 6 shows an implementation with two substrates, more substrates could be used, e.g., with one or more of the transformers together on one or more separate substrates that do not have transmitter, receiver, driver, encoding, or decoding circuitry.

Figure 7A:
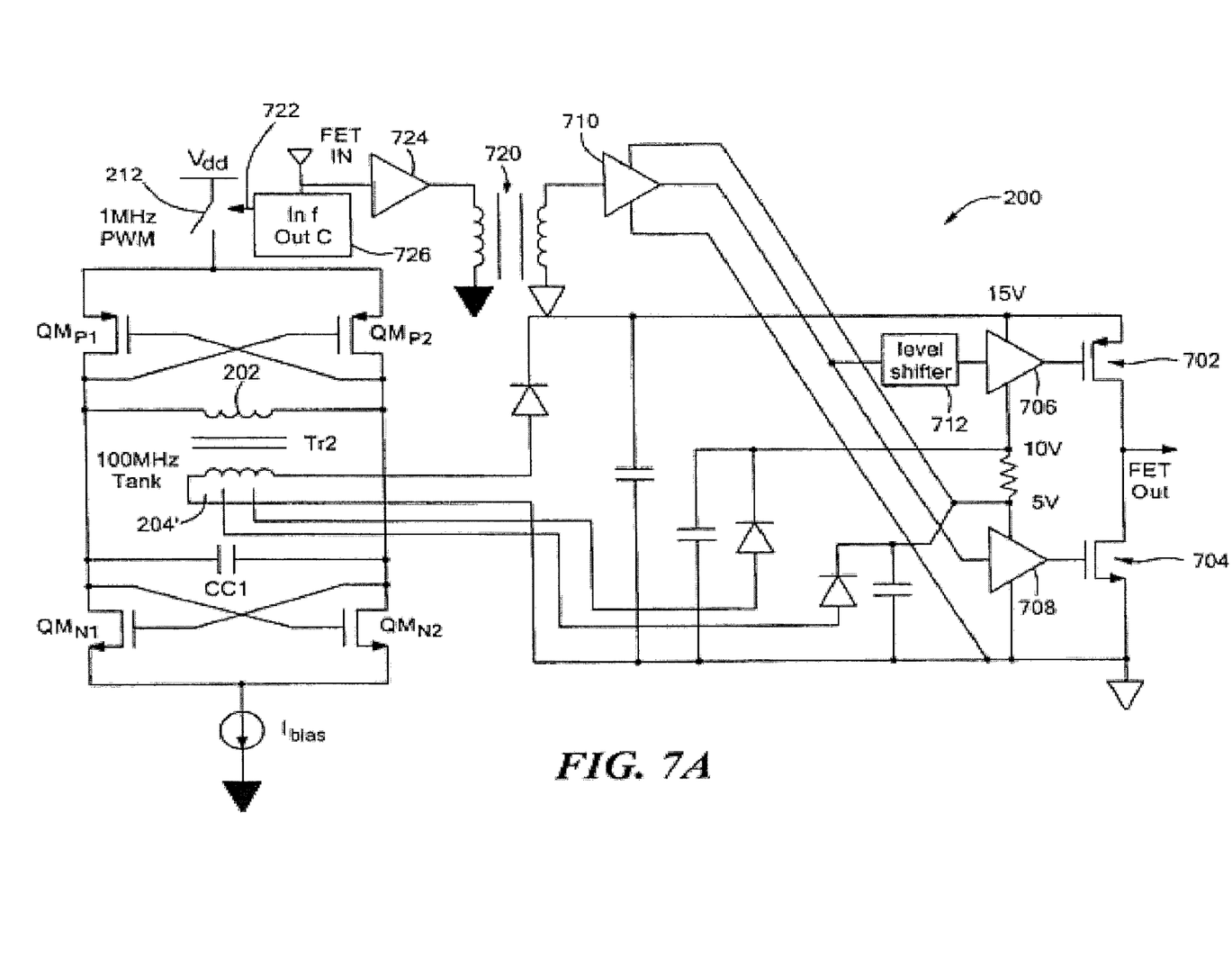
FIGS. 7A and 8A are schematics of isolated FET drivers.
Figure 8A:
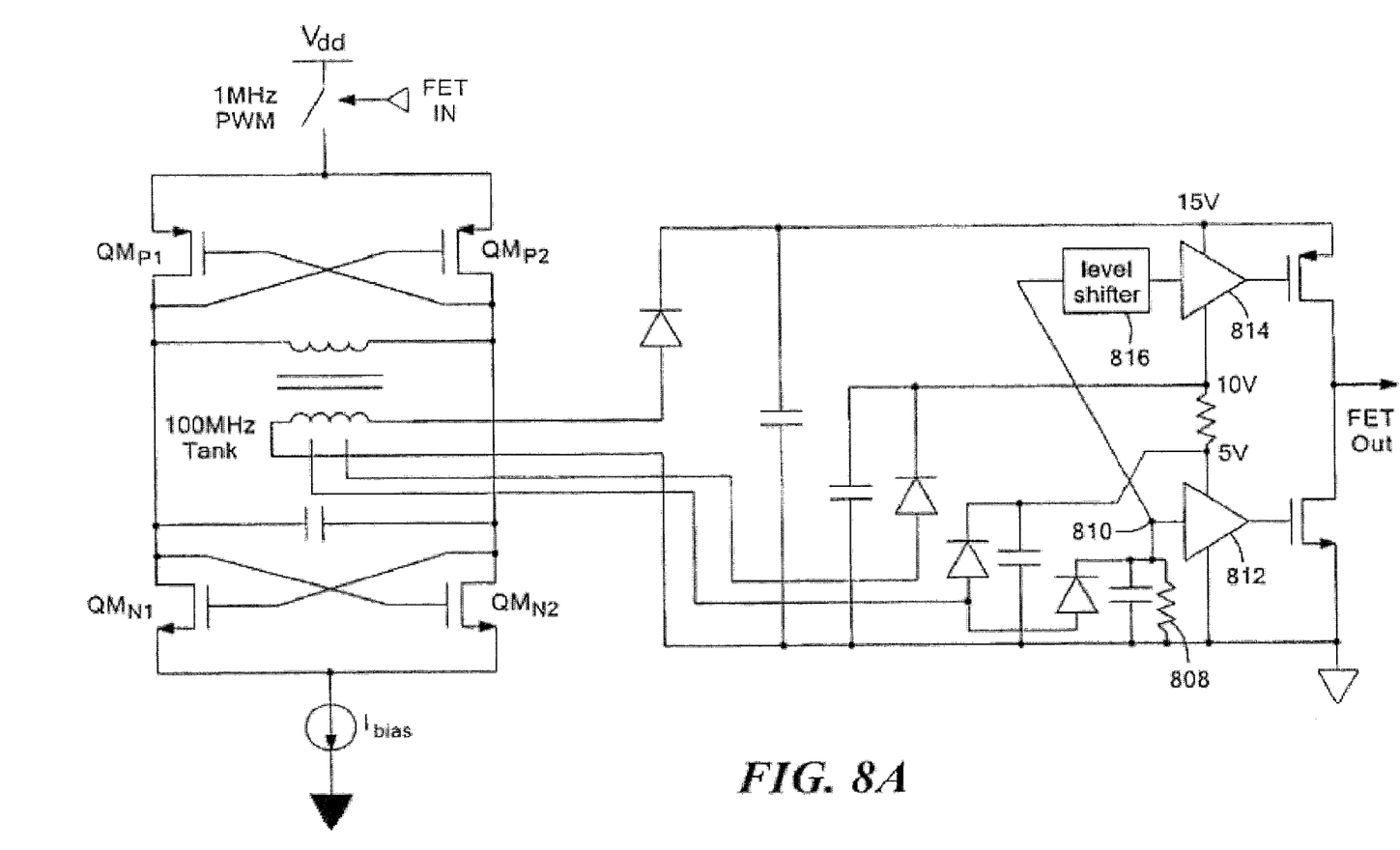

A micro-transformer-based power converter can be used to drive an output circuit, such as an output with isolated-gate field effect transistors (IGFETs), in a way that provides power and logic information. FIGS. 7A and 8A depict two examples of IGFET drivers, with FIG. 7A having two transformers for separately providing logic and power, and FIG. 8A modulating the power converter to provide power and logic.

Figure 7B:
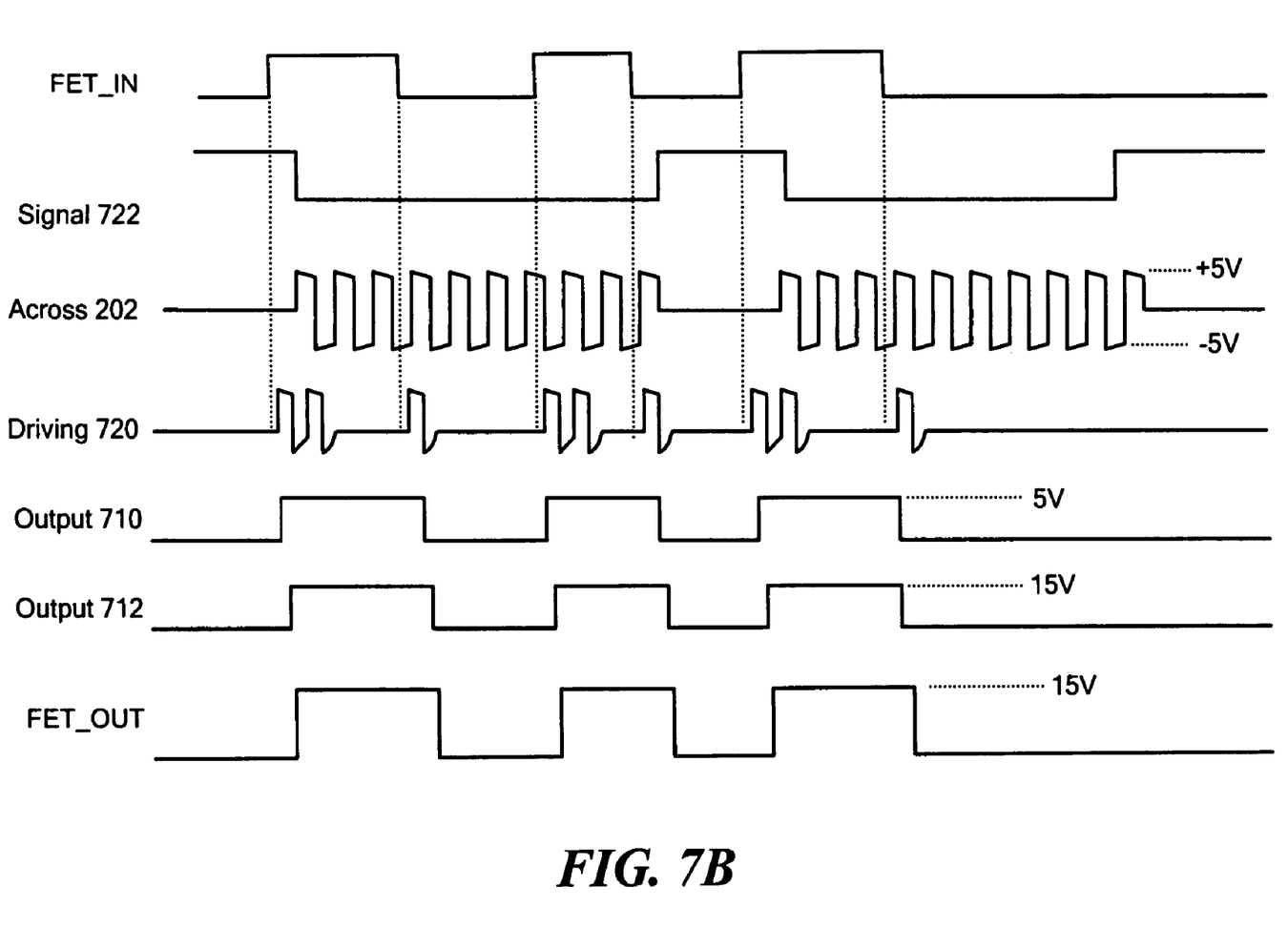
FIGS. 7B and 8B are graphs of waveforms for the circuits of FIGS. 7A and 7B, respectively.

Referring to FIGS. 7A and 7B, a voltage supply is coupled through a switch 212 to a coil driver that drives a transformer in a manner similar to that in the circuitry in FIG. 2A. In this case, a FET IN logic signal, shown in FIG. 7B, is provided to a driver 726 that uses the input frequency and the output capacitance of the system as factors to provide a control signal 722 with a frequency of about 1 MHz to control switch 212. As shown in FIG. 7B, the signal has half the period and is inverted and delayed compared to FET IN. When signal 722 is low, the switch is closed and the signal across coil 202 (and hence coil 204) oscillates between +5 volts and −5 volts at a high frequency, such as a frequency over 10 MHz, and preferably at about 100 MHz.

Coil 204 is tapped to provide three signals, each of which is provided to a separate forward biased diode in parallel with a capacitor to provide regulated voltages at +15, +10, and +5 volts, and with a ground isolated from the input side of the transformer.

The FET IN signal is also provided through an encoder 724, transformer 720, and decoder 710 in a manner similar to that in FIG. 2A, as shown by the signal in FIG. 7B across transformer 720. The voltage inputs to encoder 710 are 5 volts and 0 volts, so the output of decoder 710 is an isolated logic signal that mimics FET IN. The output of decoder 710 is provided to a low side FET driver 708 and also to a level shifter 712 and then to high side FET driver 706. The level shifter shifts the signal from decoder 710 from a range of 0-5 volts, to a range of 10-15 volts. Amplifiers 706 and 708 are each coupled to the gates of IGFETs 702 and 704, respectively. The resulting FET OUT signal is a delayed version of FET IN, and is provided at 15 volts.

Figure 8B:
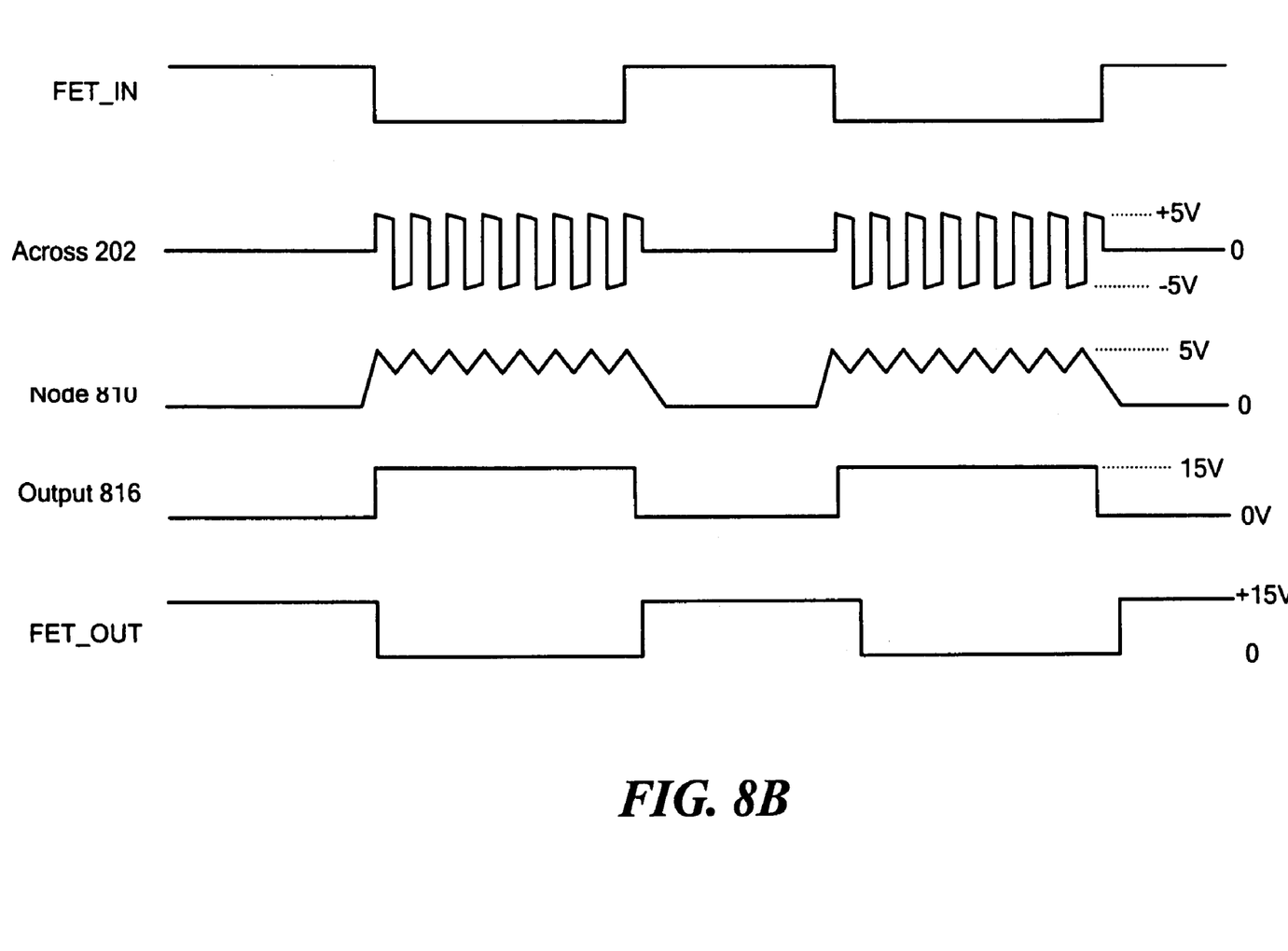

FIG. 8A is another embodiment that utilizes a similar principle to FIG. 7A, but uses one transformer for power and information transfer across an isolation barrier. As with FIG. 7A, a FET IN signal controls a switch between a voltage supply and a coil driver that drives a tank circuit, and thereby modulates the power output. As shown in FIG. 8B, the FET IN signal controls the switch and the tank circuit provides a high frequency oscillating signal when the switch is closed, e.g., at greater than 10 MHz and preferably greater than 100 MHz.

As with FIG. 7A, the secondary winding is tapped, and each of the lines from the transformer is provided to a separate diode in parallel with a capacitor to produce regulated outputs at +15, +10, and +5 volts. The +5 volt output at node 810 drives a resistive load 808 and is also provided to a level shifter 816 and then to a first driver 814 powered between 15 volt and 10 volt supplies, and also to a second driver 812 powered between a 5 volt supply and ground. Level shifter 816 translates the signal into the second driver 812 into a correct voltage range to drive the first driver 814. As shown in FIG. 8B, the signal at node 810 is inverted from FET IN and, when high, has a small ripple. The output from level shifter 816 is similar, but is between +15 and +10 volts. The resulting FET OUT signal is between 15 and 0 volts and follows the FET IN logic signal.

Figure 9:
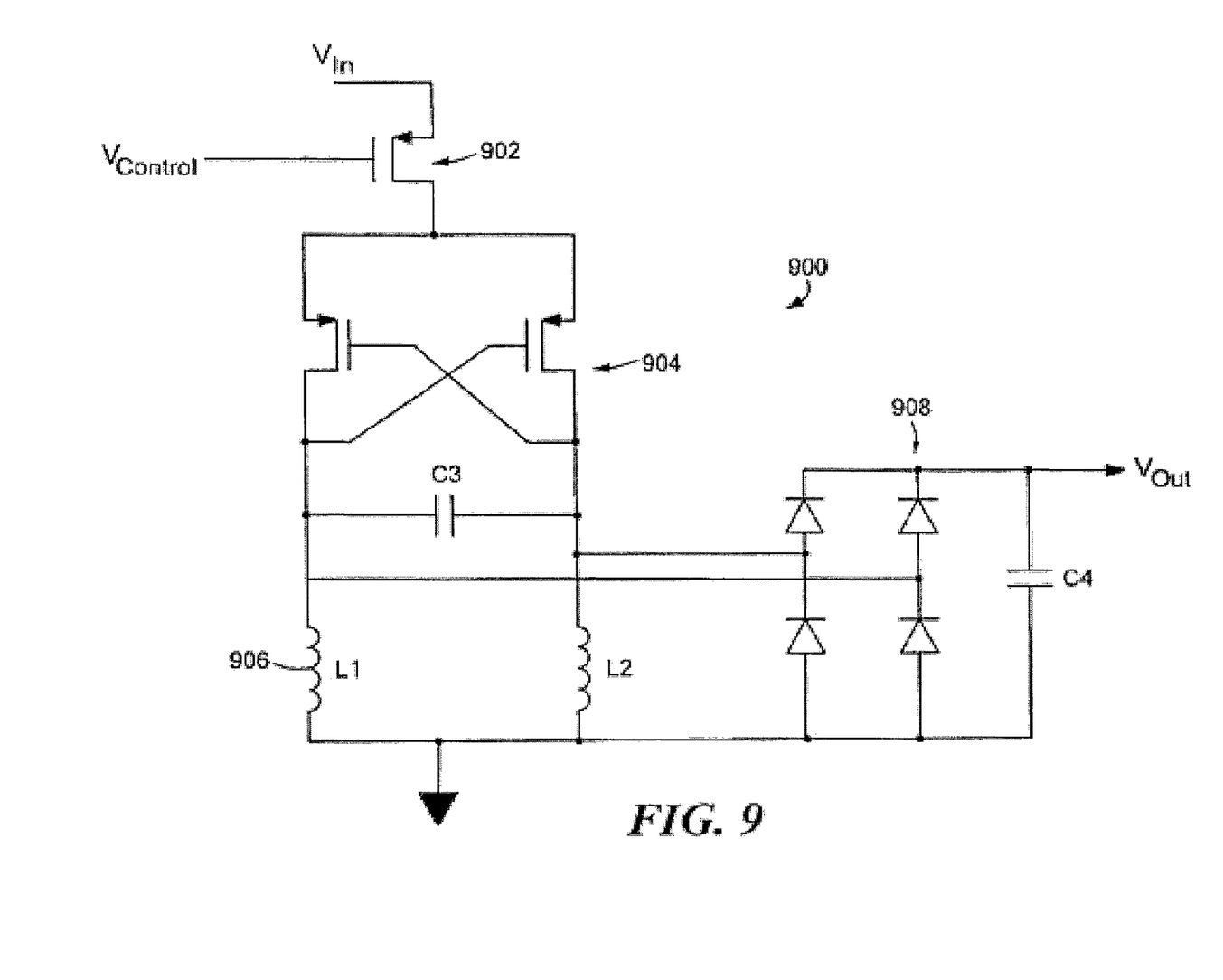
FIG. 9 is a schematic of a power converter that can be provided without isolation.

FIG. 9 is an example of a non-isolated power converter 900 that uses some similar principles to the circuits described above, including an aspect of the coil driver in FIG. 2A. A voltage input VIN is coupled to a switch 902 controlled by a relatively low frequency signal, Vcontrol, and a coil driver 904 formed as a cross-coupled PMOS transistors with the source of each transistor coupled to the gate of the other transistor to provide a positive feedback. Coil driver 904 is coupled to a tank circuit 906 with a first inductor L1 in parallel with a capacitor C3 and a second inductor L2. Tank circuit 906 produces a high frequency oscillation that is provided to a rectifier 908 and then a filtering capacitor C4 to provide an output VOUT. The control signal to switch 902 can have a frequency of about 1 MHz, while the tank circuit has a much higher frequency, e.g., 100 MHz. This circuit preferably does not have an inductor in series with then output from the rectifier.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only. For example, while the tank circuit has been described in these examples with a frequency of 100 MHz, other frequencies could be used, preferably higher than 10 MHz, and more preferably higher than 50 MHz. While the power converters shown are DC-DC, aspects of the circuits above could be used in other converters (AC-AC, DC-AC, or AC-DC).

What is claimed is:

1. A power converter comprising:
   a first micro-transformer for receiving an input signal at a first planar winding and for providing an isolated signal isolated from the received signal at a second planar winding;
   a coil driver, including transistors connected in a positive feedback configuration, coupled to the first planar winding;
   a switch for coupling a voltage to the coil driver;
   an output terminal for supplying a regulated DC signal based on the isolated signal; and
   a feedback circuit coupled to the output terminal and the switch, the feedback circuit including a second micro-transformer.

2. The power converter of claim 1, wherein the coil driver controls the signal received at the first winding of the first micro-transformer.

3. The power converter of claim 2, wherein the switch couples the voltage source to the coil driver.

4. A circuit comprising:
   a single micro-transformer having a primary winding and a secondary winding;
   a coil driver, including transistors connected in a positive feedback configuration, coupled to the primary winding;
   a switch coupling a voltage to the coil driver; and
   a rectifier coupled to the secondary winding providing a DC output;
   wherein the switch has a control port controlled by a logic information signal, the circuit providing power conversion and the logic signal through said single micro-transformer.

5. The circuit of claim 4, wherein said primary winding and said secondary windings are planar windings.

6. A circuit comprising:
   a transformer having a primary winding and a secondary winding;
   a coil driver, including transistors connected in a positive feedback configuration, coupled to the primary winding;
   a switch coupling a voltage to the coil driver;
   a rectifier coupled to the secondary winding providing a DC output; and
   a driver coupled to a control port of the switch;
   wherein the control part of the switch is controlled by a logic information signal, the circuit providing power conversion and the logic information signal through said transformer.

7. The circuit of claim 6, wherein said transformer is a micro-transformer.

8. The circuit of claim 7, wherein said primary winding and said secondary windings are planar windings.

* * * * *